United States Patent
Li

(10) Patent No.: US 11,299,604 B2
(45) Date of Patent: Apr. 12, 2022

(54) RUBBER MIXTURE AND TIRE MADE BY THE SAME

(71) Applicants: Zhejiang Geely Holding Group Co., LTD., Hangzhou (CN); Zhejiang Geely Automobile Research Institute Co., LTD., Taizhou (CN)

(72) Inventor: Shufu Li, Hangzhou (CN)

(73) Assignees: ZHEJIANG GEELY HOLDING GROUP CO., LTD., Zhejiang Province (CN); ZHEJIANG GEELY AUTOMOBILE RESEARCH INSTITUTE CO., LTD., Zhejiang Province (CN)

( * ) Notice: Subject to any disclaimer, the term of this patent is extended or adjusted under 35 U.S.C. 154(b) by 0 days.

(21) Appl. No.: 16/490,072

(22) PCT Filed: May 15, 2018

(86) PCT No.: PCT/CN2018/086804
§ 371 (c)(1),
(2) Date: Aug. 29, 2019

(87) PCT Pub. No.: WO2018/210218
PCT Pub. Date: Nov. 22, 2018

(65) Prior Publication Data
US 2020/0062934 A1 Feb. 27, 2020

(30) Foreign Application Priority Data
May 17, 2017 (CN) .......................... 201710349624.8

(51) Int. Cl.
| | | |
|---|---|---|
| *C08L 9/06* | (2006.01) | |
| *B60C 1/00* | (2006.01) | |
| *C08L 9/00* | (2006.01) | |
| *C08K 3/013* | (2018.01) | |
| *C08K 3/011* | (2018.01) | |
| *C08K 5/00* | (2006.01) | |
| *C08L 7/00* | (2006.01) | |
| *C08L 23/16* | (2006.01) | |

(52) U.S. Cl.
CPC ........ *C08L 9/06* (2013.01); *B60C 1/00* (2013.01); *C08K 3/011* (2018.01); *C08K 3/013* (2018.01); *C08K 5/0025* (2013.01); *C08L 7/00* (2013.01); *C08L 9/00* (2013.01); *C08L 23/16* (2013.01); *C08L 2201/08* (2013.01); *C08L 2205/025* (2013.01); *C08L 2205/03* (2013.01); *C08L 2205/035* (2013.01); *C08L 2312/00* (2013.01)

(58) Field of Classification Search
CPC ........ B60C 1/00; C08K 5/435; C08K 5/0025; C08K 3/011; C08K 3/013; C08K 5/5398; C08K 7/14; C08L 9/00; C08L 9/06; C08L 7/00; C08L 23/16; C08L 2201/08; C08L 2205/035; C08L 2312/00; C08L 2205/02; C08L 2205/025; C08L 2205/03
See application file for complete search history.

(56) References Cited

U.S. PATENT DOCUMENTS

| | | | | |
|---|---|---|---|---|
| 2007/0043139 A1* | 2/2007 | Cho | ....................... | B60C 1/0016 523/102 |
| 2011/0319519 A1* | 12/2011 | Sone | ....................... | C08L 15/00 523/155 |
| 2015/0240054 A1* | 8/2015 | Yamamoto | ............. | C08K 5/435 524/169 |

FOREIGN PATENT DOCUMENTS

| | | |
|---|---|---|
| CN | 1916066 A | 2/2007 |
| CN | 104177667 A | 12/2014 |
| CN | 104672557 A | 6/2015 |
| CN | 106574078 A | 4/2017 |
| CN | 107254077 A | 10/2017 |
| JP | H5-140115 A | 6/1993 |
| JP | H11-29657 A | 2/1999 |
| JP | 2013-133390 A | 7/2013 |
| JP | 2016-108516 A | 6/2016 |
| WO | 92/05218 A1 | 4/1992 |

OTHER PUBLICATIONS

Thomas L. Jablonowski, "TBzTD and CBBS—Alternative Accelerators for Reducing Nitrosamine Generation", Rubber World, Aug. 1992, pp. 18-22, vol. 206, Issue No. 5.

Thomas L. Jablonowski, "Alternative Accelerators Used to Reduce Nitrosamine Production—TBzTD and CBBS", Rubber Reference Materials, 1993, pp. 49-54, vol. 23, Issue No. 4, China Academic Journal Electronic Publishing House.

Peng Bai, Zhen Xi Liang, Su Juan Zhao, Weixiang Wang, "Application of Environmentally Friendly Accelerator TBSI in Rubber", World Rubber Industry, Jul. 2011, pp. 10-16, vol. 38, Issue No. 7.

Xin-Hua Lin, Zhao-Hui Chen, Di-Zhen Wang, "Effects of Three Zinc Salt Accelerators on Vulcanization of Natural Rubber", Journal of South China University of Technology (Natural Science Edition), Nov. 2008, pp. 153-156, 161, vol. 36, Issue No. 11, China Academic Journal Electronic Publishing House.

(Continued)

*Primary Examiner* — Angela C Scott
(74) *Attorney, Agent, or Firm* — Cheng-Ju Chiang

(57) ABSTRACT

The present disclosure provides a rubber mixture and a tire made the same. The rubber mixture consists essentially of: at least one kind of polar or non-polar rubber, at least one kind of filler, at least one kind of vulcanizing agent, at least one kind of accelerant, an optional anti-scorching agent, and an optional aromatic material. The accelerant is a compound containing two or more X-Y single bonds, wherein X is selected from element O and S, and Y is selected from element N and P. The rubber mixture and the tires of the present disclosure adopt improved accelerants and anti-scorching agents to reduce the generation of pungent volatile organic compound such as aniline, cyclohexylamine, tert-butylamine, and imine, thereby improving the odor problem of the tire. Meanwhile, the present disclosure omits carbon black, zinc oxide and other substances with fine powders, thereby reducing dust hazards to the operators.

6 Claims, No Drawings

(56) References Cited

OTHER PUBLICATIONS

Rubber Professional Committee of China Association of Chemical Industry, "Inorganic Reinforcing Agents and Filling Agents", Handbook for Rubber Additives, Apr. 2000, p. 461, 1st Issue, Chemical Industry Press, China.

Shouwu Yu, Shujuan Xiao, Jinjin Shao, "Filling Compounding and Molecular Assembly", Modification of Polymer Materials—Principle and Technology, May 10, 2015, pp. 161, 163, 1st Issue, Intellectual Property Publishing House, China.

* cited by examiner

RUBBER MIXTURE AND TIRE MADE BY THE SAME

CROSS-REFERENCE TO RELATED APPLICATION

The present application is a 35 U.S.C. § 371 National Phase conversion of International (PCT) Patent Application No. PCT/CN2018/086804, filed on May 15, 2018, which claims priority of Chinese Patent Application No. 201710349624.8, filed on May 17, 2017. The entire disclosure of the above to identified application, including the specification and claims are incorporated herein by reference in its entirety. The PCT International Patent Application was filed and published in English.

TECHNICAL FIELD

The present disclosure relates to automobile technology, and more particular to a low-odor, environmental friendly rubber mixture and a tire especially a spare tire made by the rubber mixture.

BACKGROUND ART

Tire is one of the most important components in a vehicle, which directly contacts with the road surface, bears vehicle gravity, transmits traction, braking force and steering force, and endures counter force of the road. Cooperating with automotive suspension system, the tire buffers the impact on the vehicle during traveling and ensures the vehicle having good ride comfort. Furthermore, the tire keeps the wheel having good adhesion with the road surface, improves the traction performance, the braking performance and the trafficability of the vehicle, and bears the weight of the vehicle body. Accordingly, the important role of the tire in the vehicle is getting more and more attention.

Due to tires will wear and tear during use, the tire will blowout occasionally in the absence of replacement for a long period of time. For facilitating the safe driving of the vehicle, a spare tire is usually provided for a sport utility vehicle (SUV) in case of need. The spare tire is usually placed at the rear of the sedan or at the bottom of the trunk of the hatchback. As we all know, the main components of the existing tires are rubber and additives. The new spare tire will emit bad odors and affect human health. In order to reduce the health hazards to the passengers after the odor emitted by the spare tire spread to the cab, the commonly used method is to seal the spare tire by a sealed bag. However, this method could not solve the odor problem of the tire from the root.

With the implementation of laws and regulations related to worker protection and non-toxic and environmental friendly production in the world, especially in Europe and the United States, it is a trend for automobile companies, especially passenger car manufacturers, to pay more attention to reduce the odor of the tire products.

In order to solve the above problems, the applicant analyzed the actual use scenario of the spare tire and found that the minimum requirement for the spare tire is to solve the urgent requirement caused by tire burst, so that the driver can replace the spare tire in time and travels to a nearby maintenance office to replace an original new tire in a speed not lower than the minimum allowable speed (for example, 60 to 80 km/h) of the freeway. The distance traveled by the spare tire is usually 20 to 30 km.

For normal tires, the existing tire production materials and processes will generate dust and smoke in high temperature condition, and generate irritant gases due to volatilization of raw materials and products, and degradation of additives, and accordingly affects the health of the workers. During use, the friction generated between the tire and the road surface, and the fact that the tire being heated by the sun will cause the rubber material in the tire to evaporate bad odor and affect the ride comfort of the vehicle. If this occurs for a long period, it will further affect the health of the drivers who drives all year round.

Chinese Patent Publication Number CN104672557A discloses a pneumatic rubber tire prepared from the following raw materials: 20 to 30 parts by weight of styrene-butadiene rubber, 20 to 30 parts by weight of natural rubber, 4 to 5 parts by weight of zinc oxide, 10 to 12 parts by weight of carbon black, 4 to 5 parts by weight of silica, 2 to 3 parts by weight of isoprene, 1 to 3 parts by weight of cross-linking agent, 2 to 3 parts by weight of sulfur, 3 to 5 parts by weight of stearic acid, and 1 to 2 parts by weight of antioxidant. However, the above composition contains a variety of hazardous substances, such as zinc oxide dust is likely to cause damage to the respiratory system of the workers, carbon black is likely to cause harm to the human body through the respiratory tract and the skin.

Therefore, it is necessary to provide a low odor and environmental friendly rubber mixture and a tire made by the rubber mixture, which could improve the odor problem of the tire, and reduce harm to the environment during the production, the storage and the use of the tire as well as satisfying the minimum allowable speed requirement of the freeway.

TECHNICAL SOLUTION

The embodiments of the present disclosure provide a rubber mixture consisting essentially of: at least one kind of polar or non-polar rubber, at least one kind of filler, at least one kind of vulcanizing agent, at least one kind of accelerant, an optional anti-scorching agent, and an optional aromatic material, wherein the accelerant is a compound containing two or more X-Y single bonds, wherein X is selected from element O and S, and Y is selected from element N and P.

In an embodiment of the present disclosure, the accelerant is a compound containing two or more S—N single bonds, S—P single bonds, O—P single bonds, or O—N single bonds.

In an embodiment of the present disclosure, the accelerant is N-cyclohexyl-bis (2-mercaptobenzothiazole) sulfonamide, N-tert-butyl-bis(2-benzothiazole)sulfonamide and/or zinc dialkyldithiophosphate.

In an embodiment of the present disclosure, the accelerant is used in an amount of 1 phr to 6 phr.

In an embodiment of the present disclosure, the polar or non-polar rubber is selected from one or more of the group consisting of: natural rubber, synthetic polyisoprene, butadiene rubber, styrene-butadiene rubber, solution-polymerized styrene-butadiene rubber, emulsion-polymerized styrene-butadiene rubber, nitrile rubber, liquid rubber, halogenated butyl rubber, butadiene rubber, isoprene rubber, isoprene-isobutylene copolymer, ethylene-propylene-diene rubber, chloroprene rubber, acrylate rubber, fluorine rubber, silicone rubber, polysulfide rubber, epichlorohydrin rubber, styrene-isoprene-butadiene trimer, hydrogenated acrylonitrile-butadiene rubber, isoprene-butadiene copolymer, and hydrogenated styrene-butadiene rubber.

In an embodiment of the present disclosure, the polar or non-polar rubber is selected from one or more of the group consisting of: natural rubber, styrene-butadiene rubber, nitrile rubber, butadiene rubber, isoprene rubber, and ethylene-propylene-diene rubber.

In an embodiment of the present disclosure, the polar or non-polar rubber is used in an amount of 0.1 phr to 80 phr.

In an embodiment of the present disclosure, the polar or non-polar rubber is natural rubber or synthetic polyisoprene, and the use amount is 0.1 phr to 20 phr.

In an embodiment of the present disclosure, the polar or non-polar rubber is butadiene rubber, and the use amount is 2 phr to 50 phr.

In an embodiment of the present disclosure, the polar or non-polar rubber is styrene-butadiene rubber, the use amount is 2 phr to 80 phr.

In an embodiment of the present disclosure, the filler is selected from one or more of the group consisting of: glass fiber, modified kaolin, attapulgite, magnesium carbonate, copper fiber and glass beads, and the filler is used in an amount of 20 phr to 80 phr.

In an embodiment of the present disclosure, the at least one kind of vulcanizing agent includes: sulfur, selenium, tellurium, sulfur-containing compounds, peroxides, quinone compounds, amine compounds, resin compounds, metal oxides, isocyanates, platinum vulcanizing agent, or N, N'-m-phenylene bismaleimide, and the vulcanizing agent is used in an amount of 1 phr to 10 phr.

In an embodiment of the present disclosure, the anti-scorching agent is N-chloroformylthio-4-propionene-dicarboximide and/or a mixture of 92% of benzene sulfonamide derivative, 6% of inert filler and 2% of oil, and the anti-scorching agent is used in an amount of 0.1 phr to 5 phr.

In an embodiment of the present disclosure, the aromatic substance is a high-temperature-resistant aromatic substance which is plant essence or mint, and the high-temperature-resistant aromatic substance is used in an amount of 0.1 phr~3 phr.

The embodiments of the present disclosure further provide a tire made of the above rubber mixture.

The rubber mixture and the tires (especially spare tires) made by the rubber mixture of the present disclosure utilize improved accelerants to avoid generation of the pungent volatile organic compound such as aniline, cyclohexylamine, tert-butylamine and the like, therefore improving the odor problems of the tires. In addition, when the use of anti-scorching agent is required, the present disclosure instead the CTP in the prior art by CTT and VE.C to reduce the generation of pungent imine, which also has a positive effect on improving the tire odor. Meanwhile, the present disclosure does not include carbon black, zinc oxide and other substances with fine powders, which reduces dust hazards to the operation workers. Finally, the addition of aromatic substances further enhances the fragrance of the tires on the premise of having as little volatile organic volatiles as possible.

In order to further elucidate the technical means and efficacy of the present disclosure for achieving the intended purpose of the disclosure, the present disclosure will be described in more detail with reference to the preferred embodiments as follow.

DETAILED DESCRIPTION OF PREFERRED EMBODIMENTS

Embodiments of the present disclosure will now be described more apparently and completely with reference to the embodiments. Obviously, the illustrated embodiments are only a part but not all of the embodiments of the present disclosure. All the other embodiments which could be obtained without creativity by one of ordinary skill in the art according to the illustrated embodiments would be claimed within the scope of the present disclosure.

The rubber mixture of the invention is used to make vehicle tires, especially spare tires. The rubber mixture consists of: at least one polar or non-polar rubber, at least one filler, at least one vulcanizing agent, at least one accelerant, an optional anti-scorching agent, and an optional aromatic material.

The polar or non-polar rubber is selected from a group consisting of: natural rubber, synthetic polyisoprene, butadiene rubber (BR), styrene-butadiene rubber, solution-polymerized styrene-butadiene rubber, emulsion-polymerized styrene-butadiene rubber, nitrile rubber, liquid rubber, halogenated butyl rubber, butadiene rubber, isoprene rubber, isoprene-isobutylene copolymer, ethylene-propylene-diene rubber (i.e., EPDM rubber), chloroprene rubber, acrylate rubber, fluorine rubber, silicone rubber, polysulfide rubber, epichlorohydrin rubber, styrene-isoprene-butadiene trimer, hydrogenated acrylonitrile-butadiene rubber, isoprene-butadiene copolymer, and hydrogenated styrene-butadiene rubber. In the present disclosure, the polar or non-polar rubber is a mixture of natural rubber or synthetic polyisoprene, butadiene rubber and styrene-butadiene rubber, wherein the use amount of the natural rubber or synthetic polyisoprene is 0.1 phr to 20 phr, the use amount of butadiene rubber is 2 phr to 50 phr, the use amount of styrene-butadiene rubber is 2 phr to 80 phr.

Preferably, the polar or non-polar rubber is one or more of natural rubber, styrene-butadiene rubber, nitrile rubber, butadiene rubber, isoprene rubber, and EPDM rubber. The natural rubber refers to an elastic solid material obtained from solidifying and drying a natural rubber latex collected from a rubber tree in Brazil. The natural rubber is a natural polymer compound with polyisoprene as its main component. The molecular formula of the natural rubber is $(C_5H_8)_n$, and the content of rubber hydrocarbon (polyisoprene) in the natural rubber is higher than 90%, and the natural rubber also includes a small amount of protein, fatty acid, sugar and ash. The natural rubber has high elasticity, slightly plastic, excellent mechanical strength, and low hysteresis loss at room temperature, and has low heat generation performance after many times of deformation and good bending resistance, is a non-polar rubber and has good electrical insulation property.

The styrene-butadiene rubber is also known as polystyrene-butadiene copolymer, its wear resistance, heat resistance, anti-aging and vulcanization speed is more excellent than natural rubber. Applicant found by tests that styrene-butadiene rubber can be used in combination with natural rubber and many kinds of synthetic rubbers.

The nitrile rubber (NBR) is obtained by emulsion polymerization of butadiene and acrylonitrile, and has excellent oil resistance, wear resistance and heat resistance.

The liquid rubber is a material which could flow at room temperature but could form a cross-linked structure after chemical reaction with a curing agent. The liquid rubbers can be roughly classified into the following categories depending on the type of main chain: diene type liquid rubber, chain olefin type liquid rubber, polyurethane type liquid rubber (such as polyether polyol, polyester polyol), liquid silicone rubber, liquid polysulfide rubber and liquid fluorine rubber.

The halogenated butyl rubber is classified into chlorinated butyl rubber and brominated butyl rubber, and the halogenated butyl rubber is a product of halogenation reaction of chlorine or bromine with ordinary butyl rubber dissolved in aliphatic hydrocarbons such as hexane.

The butadiene rubber is an abbreviation of cis-1,4-polybutadiene rubber. The butadiene rubber is a synthetic rubber with regular structure and obtained from polymerizing butadiene. The butadiene rubber can be classified into nickel, cobalt, titanium and tombarthite butadiene rubber depending on the catalyst used in the synthesis process. Butadiene rubber is the second largest synthetic rubber behind styrene-butadiene rubber. Compared with natural rubber and styrene-butadiene rubber, the butadiene rubber has excellent cold resistance, wear resistance and elasticity after vulcanization, and is easy to use in combination with natural rubber, chloroprene rubber or nitrile rubber.

The isoprene rubber is also known as polyisoprene rubber, or cis-1,4-polyisoprene rubber. The isoprene rubber is a synthetic rubber, and its structure and properties are similar to natural rubber, therefore, the isoprene rubber is also known as synthetic natural rubber.

Table 1 below shows suitable calendering temperature and general extrusion temperature for some of the rubber material.

TABLE 1

Suitable calendering temperature and general extrusion temperature for some of the rubber material

| Material type | Suitable calendering temperature(° C.) | | | General extrusion temperature(° C.) | | |
|---|---|---|---|---|---|---|
| | Top roll | Middle roll | Bottom roll | Cylinder | Head | Die |
| Natural rubber | 100-110 | 85-95 | 60-70 | 50-60 | 80-85 | 90-95 |
| Butadiene rubber | 55-75 | 50-70 | 55-65 | — | — | — |
| Styrene-butadiene rubber | 50-70 | 54-70 | 55-70 | 50-70 | 70-80 | 100-105 |
| Nitrile rubber | 80-90 | 70-80 | 70-90 | 50-60 | 70-80 | 70-95 |
| Chloroprene rubber | 90-120 | 60-90 | 30-40 | 50-60 | 60-70 | 80-90 |
| Butyl rubber | — | — | — | 80 | 80-95 | 90-120 |

From Table 1, it can be seen that the processing temperature of rubber is generally lower than 100° C. If the melting point of a substance in the rubber mixture is lower than or close to the processing temperature of the rubber, it is easily cause chemical bond breakage and generate other substances.

In the present disclosure, the at least one kind of filler constitutes the skeleton of the tire, which is similar to the "rebar" in a building. The filler is selected from a group consisting of: glass fiber, modified kaolin, attapulgite, magnesium carbonate, copper fiber, glass beads and so on. In the present disclosure, the filler is used in an amount of 20 phr to 80 phr.

In an embodiment of the present disclosure, the at least one kind of vulcanizing agent includes element sulfur, selenium, tellurium, sulfur-containing compounds, peroxides, quinone compounds, amine compounds, resin compounds, metal oxides, isocyanates, platinum vulcanizing agent, N, N'-m-phenylene bismaleimide (also known as vulcanizing agent PDM) and so on. Preferably, the at least one kind of vulcanizing agent is sulfur and sulfur-containing compounds. In the present disclosure, the vulcanizing agent is not TMTD or TETD, which generates the carcinogen N-nitrosodimethylamine during vulcanization, but the platinum vulcanizing agent and N,N'-m-phenylene bismaleimide. In the present disclosure, the vulcanizing agent is used in an amount of 1 phr to 10 phr.

In the present disclosure, the accelerant, also known as additives of the vulcanization system, is a type of rubber additives. In the vulcanization process of the rubber, in combination with the vulcanizing agent, the accelerant could shorten vulcanization time, lower vulcanization temperature, reduce the usage amount of the vulcanizing agent and increase the physical and mechanical performance of the rubber. The function of the accelerant is to improve the vulcanization process of the rubber. Considering the requirement of the rubber vulcanization processing, the ideal accelerant should have the following characteristics: having long coking time to make sure the operation safety before vulcanization start; having short vulcanization time to facilitate the improvement of producing efficiency; having long plateau vulcanization period, having no vulcanization reversion phenomenon, no toxicity and no pollution.

Under normal circumstances, volatile organic compounds (VOC) are the main source of the tire odor in production, storage and use of the tires. Therefore, reducing the generation of the volatile organic compounds is one of the means to reduce the tire odor. The applicant has analyzed the molecular structure, formula weight and melting point of several existing rubber accelerants and found that all the existing accelerants produce irritating odors. For example, N-cyclohexyl-2-benzenethiazolylsulfenamide, whose trade name is accelerant CZ, abbreviated as CBS, is easily produce cyclohexylamine when heated, and cyclohexylamine is a kind of pungent odor. N-tert-butyl-2-benzthiazolyl sulfenamide, whose trade name is accelerant NS, abbreviated as TBBS, is easily generate tert-butylamine when heated, and tert-butylamine is a kind of harmful substances. Diphenylhydrazine, whose trade name is accelerant D, abbreviated as DPG, is irritating when contacts with the skin and easily generates aniline when heated, and aniline is a kind of pungent odor.

For this reason, the applicant has not used the above-mentioned accelerants, and utilizes a compound containing two or more X-Y single bonds as the accelerant of the present invention, wherein X is selected from element O, S, and the like, Y is selected from element N, P, and the like. Furthermore, the present disclosure employs a compound containing two or more S—N single bonds, S—P single bonds, O—P single bonds, or O—N single bonds as the accelerant. Moreover, the accelerant CBBS (chemical name:

N-cyclohexyl-bis (2-mercaptobenzothiazole) sulfenamide) was used as an accelerant instead of accelerant CBS and the accelerant TBSI (chemical name: N-tert-butyl-bis(2-benzothiazole)sulfonimide) was used as an accelerant instead of accelerant TBBS, the accelerant ZDTP (zinc dialkyldithiophosphate) was used as an accelerant instead of accelerant DPG. In the present disclosure, the accelerant is used in an amount of 1 phr to 6 phr.

linked to the amino group is, the higher the melting point is, which causes the product is more difficult to decompose, the decomposition rate is slower, and the odor is lighter.

In order to verify the effect of the accelerants and the anti-scorching agents of the present application on reducing the tire odors, the applicant made comparative on odor tests and odor evaluations for the accelerants and the anti-scorching agents used in the prior art and in the present application.

TABLE 2

Comparison of existing accelerants with the accelerants of the present invention

| The existing accelerants | The accelerants of the present invention |
|---|---|
| Accelerant CBS 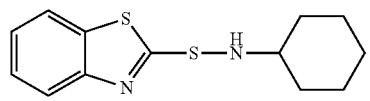 Formula weight: 264; Melting point: 98° C. | Accelerant CBBS 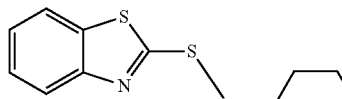 Formula weight: 430; Melting point: >120° C. |
| Accelerant TBBS 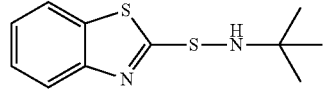 Formula weight: 238; Melting point: 107° C. | Accelerant TBSI 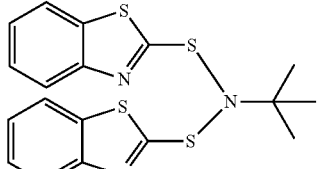 Formula weight: 404; Melting point: >130° C. |
| Accelerant DPG 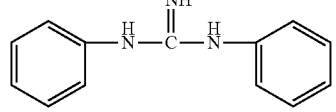 | Accelerant ZDTP 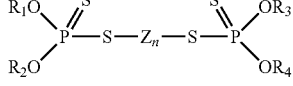 |

Table 2 shows the comparison of the molecular structure, the formula weight and the melting point between the existing accelerant and the accelerant of the present invention. From Table 2, it can be seen that the accelerant CBS of the prior art has only one S—N single bond, and is easy to break and generate cyclohexylamine, while the accelerant CBBS of the present application has two S—N single bonds and is not easy to generate cyclohexylamine. Similarly, the accelerant TBBS of the prior art has only one S—N single bond and the accelerant TBSI of the present application has two S—N single bonds. The accelerant DPG of the prior art has C—N single bond and is easy to break and generate aniline. In the present application, although the accelerant ZDTP has two independent S—P single bonds, two independent S—Zn single bonds, and four independent P—O single bonds, due to S—Zn bond is a metal chelate bond, the force in the bond is strong and not easy to break. Furthermore, due to element P is already a pentavalent element, even if the P—O single bond breaks, it could only generate alcohols which does not have irritating odor. It can be seen that the larger the formula weight is and the larger the group Respectively weighing 10 g of DPG and 10 g of ZDTP, 10 g of TBBS and 10 g of TBSI, 10 g of CBS and 10 g of CBBS, performing accelerant odor test according to odor test standard SMC 30156 of vehicle trim materials and to odor detection standard PV9000 of components in passenger compartment. The odor test method includes: sealing the accelerant by an odorless bottle, keeping the bottle in a constant temperature 80° C. for 2 hours, then cooling the temperature to 65° C., and starting a human olfactory test to obtain the odor detection and evaluation results in Table 3.

TABLE 3

Comparison of odor detection and evaluation results of the accelerants in the prior art and in the present application

| | | Grade and Score of the test products | |
|---|---|---|---|
| Grade | Evaluation results | Room Temperature | 80° C. × 2 h |
| 1 | Odorless | — | — |
| 2 | Odor but not pungent | CBBS(2.0), TBSI(2.0) ZDTP(2.0) | — |

TABLE 3-continued

Comparison of odor detection and evaluation results of the accelerants in the prior art and in the present application

| | | Grade and Score of the test products | |
|---|---|---|---|
| Grade | Evaluation results | Room Temperature | 80° C. × 2 h |
| 3 | Obvious odor but not pungent | — | CBBS(2.5), TBSI(2.5), ZDTP(2.5) |
| 4 | Pungent | — | — |
| 5 | Very pungent | CBS(5.0), DPG(5.0) | — |
| 6 | Unbearable | TBBS(5.5) | CBS(5.5), TBBS(6.0) DPG(6.0) |

As shown in Table 3, the odors of conventionally used TBBS, CBS, and DPG are unbearable after heating, and TBBS and DPG are particularly intolerable and getting a score of 6.0. This may due to CBS generate cyclohexylamine, TBBS generate tert-butylamine and DPG generate aniline after heating, and the odor of tert-butylamine and aniline is much heavier than cyclohexylamine. In a contrast, the accelerants TBSI, CBBS, and ZDTP used in the present application do not generate pungent odor even after heating. The above odor comparative test indicates that the accelerant used in the present application has a significant effect on improving the odor of the tire.

In order to study the odor sources of the known accelerants, the applicant performed a purity analysis on 10 grams of TBBS and 10 grams of CBS respectively, using a Shimadzu LC-20AT type purity analyzer to compare the purity of the above samples before and after heating. The purity analysis shows that the purity of TBBS is 99.5113% before heating and changes to 99.1108% after heating. The purity of CBS is 99.3525% before heating and changes to 99.3100% after heating. The purity of TBBS and CBS changes slightly after heating, and the change of the odor grade and the change of the purity before and after heating follows specific regulation. It shows that the known accelerant CBS and TBBS produce a product with pungent odor when heated, which leads to a decrease in their purity.

Furthermore, the applicant also made a thermogravimetric analysis (TGA) for the known accelerants DPG, TBBS, CBS and the accelerants ZDTP, TBSI, and CBBS in the present application by METTLER TOLEDO thermogravimetry analyzers, respectively. The thermogravimetry test steps include: keeping the sample at 30° C. for 20 minutes, heating the sample in a range from 30 to 80° C. at a ramp rate of 10° C./minute, keeping the sample at 80° C. for 30 minutes, heating the sample in a range from 80 to 130° C. at a ramp rate of 10° C./minute, keeping the sample at 130° C. for 20 minutes, and obtaining the comparison thermo-gravimetric loss data shown in Table 4.

TABLE 4

Comparison thermo-gravimetric loss data of the known accelerants and the accelerants of the present application

| Accelerants | 30° C. × 20 min | 30~80° C. | 80° C. × 30 min | 80~130° C. | 130° C. × 20 min |
|---|---|---|---|---|---|
| DPG | 0.5280% | 0.04521% | 0.1316% | 0.1268% | 0.4055% |
| ZDTP | 1.5801% | 3.0065% | 3.7941% | 0.5792% | 1.0040% |
| TBBS | 0.0221% | 0.0074% | 0.0157% | 0.3109% | 2.4591% |
| TBSI | 0.04313% | 0.01529% | 0.1015% | 0.1643% | 0.5495% |
| CBS | 0.0231% | 0.0087% | 0.0342% | 0.2503% | 1.5770% |
| CBBS | 0.4301% | 0.1416% | 0.1099% | 0.1516% | 1.0785% |

For the comparison between the first group of DPG and ZDTP, due to ZDTP is a metal chelates, there are great differences in the weight loss and there is no significance to compare. By comparing the data between TBBS and TBSI, CBS and CBBS, it can be known that the weight loss ratio differences are great, especially at 130° C. This may be due to the volatilization of the tert-butylamine generated by heating TBBS and the volatilization of cyclohexylamine generated by heating CBS.

Optionally, in the embodiment that the present application includes an anti-scorching agent, the applicant did not use the traditional anti-scorching agent CTP (also named N-cyclohexylthiophthalimide, the structure is shown in Table 5) and use the anti-scorching agent VE.C or anti-scorching agent CTT listed in Table 5 instead. This is because the applicant discovered that the known anti-scorching agent CTP contains N—S single bond, which is easily broken by heat and generates a toxic, skin-irritating imine. In the present application, the anti-scorching agent is used in an amount of 0.1 phr to 5 phr.

The anti-scorching agent VE.C includes 92% of benzene sulfonamide derivative, 6% of inert filler and 2% of oil, and the appearance of the anti-scorching agent VE.C is inert-filler-coated white powder with a melting point of about 110° C. The anti-scorching agent VE.C can be used as an effective anti-scorching agent for many of accelerant vulcanized rubber such as EPDM, to improve scorch safety and compression set, but not reduce the vulcanizing torque and the tensile stress of the vulcanizate. Preferably, the anti-scorching agent VE.C is used as an anti-scorching agent for ethylene propylene rubber.

The anti-scorching agent CTT is N-chloroformylthio-4-propionene-dicarboximide. It is a white to gray crystalline powder with a melting point of 158 to 170° C. The structural formula of anti-scorching agent CTT is shown in Table 2. Due to the melting point be high, the anti-scorching agent CTT is not easy produce toxic substances.

TABLE 5

Comparison of the structural formula between the known anti-scorching agents and the anti-scorching agents of the present application

| The known anti-scorching agent CTP | The anti-scorching agents of the present application |
|---|---|
| [structure: phthalimide with N—S—cyclohexyl] | anti-scorching agent VE.C 92% of benzene sulfonamide derivative, 6% of inert filler and 2% of oil |
| | anti-scorching agent CTT [structure: (C6H5)2S(O)2—N—S—CCl3] |

Optionally, in one embodiment of the present disclosure, the rubber mixture also includes a high-temperature-resistant aromatic substance, such as a plant essence, mint, and the like. The high-temperature-resistant aromatic substances could increase the odor of the tire, emit aromatic odors during production, storage and use of the tire, improve the working environment of the worker, and improve the cool feeling of the driver to avoid driving fatigue. The high-temperature-resistant aromatic substance is used in an amount of 0.1 phr to 3 phr.

It should be noted that in the embodiments of the present application, since the rubber mixture is mainly used for the spare tire, the carbon black is abandoned. Therefore, the harm of the carbon black powder to the human respiratory tract and the skin during tire processing process is prevented. In other embodiments, the zinc oxide is abandoned and the harm of zinc oxide dust to human respiratory tract is prevented.

The following illustrates several examples and comparative examples of the present application. It should be noted that the phr (parts per hundred parts of rubber by weight) data used in this specification are the conventional quantitative data used in the rubber industry for mixture formulations. The amounts added in parts by weight of the individual substances here are always related to 100 parts by weight of the total mass of all of the rubbers present in the mixture.

Example 1

Weighing 20 phr of natural rubber, 44 phr of butadiene rubber, 36 phr of solution-polymerized styrene-butadiene rubber, 50 phr of glass fiber, 3 phr of sulfur, 1 phr of ZDTP, and 1.5 phr of CBBS; thoroughly mixing the components other than sulfur, ZDTP and CBBS in a tangential mixer; then adding sulfur, ZDTP, and CBBS and mixing well; melting extrusion the mixture; further mixing the extrusion mixture and producing a tire sample by a conventional method in the rubber industry.

Comparative Example 1

The difference from the Comparative Example 1 and Example 1 is that the comparative example 1 utilizes the known accelerants, and specifically includes 1 phr of DPG and 1.5 phr of CBS.

Comparative Example 2

Weighing 20 phr of natural rubber, 44 phr of butadiene rubber, 36 phr of solution-polymerized styrene-butadiene rubber, 95 phr of silica, 45 phr of mineral oil, 2.5 phr of ZnO, 6.65 phr of silane, 3 phr of sulfur, 1 phr of ZDTP and 1.5 phr of CBBS; thoroughly mixing the components other than sulfur, ZDTP, and CBBS in a tangential mixer; then adding sulfur, ZDTP, and CBBS and mixing well; melting extrusion the mixture; further mixing the extrusion mixture and producing a tire sample by a conventional method in the rubber industry.

The obtained three kinds of samples were tested as follows: testing Shore A hardness at room temperature according to DIN 53505 standard, testing elasticity at room temperature and 70° C. according to DIN 53512 standard, testing tensile strength at room temperature according to DIN 53504 standard, testing wear resistance under dry conditions at a slippage of 14% and a temperature of 50° C. by a Cabot abrasion tester, and testing wear resistance under wet conditions using GAFT on the diamond surface (dullness 180). When testing the wear resistance under dry conditions, the slippage was calculated according to relative speeds of the sample wheel and the grinding wheel, and the wear index was calculated by the weight loss of the sample. When testing the wear resistance under wet conditions, the samples were tested at a slip angle of 14° and 25°, a temperature of 5° C., a load of 50N, and a speed of 4.5 km/h. The test results are shown in Table 6.

TABLE 6

Samples test results of Example 1, and Comparative Examples 1 and 2

| Test items | | Example 1 | Comparative Example 1 | Comparative Example 2 |
|---|---|---|---|---|
| Shore A hardness at room temperature | | 55.2 | 49.6 | 64.5 |
| Elasticity at room temperature(%) | | 28.6 | 26.1 | 30.6 |
| Elasticity at 70° C. (%) | | 25.3 | 20.9 | 41.5 |
| Tensile strength at room temperature(Mpa) | | 15.8 | 14.6 | 12.6 |
| Odor test | Room temperature | Unobvious odor | Obvious odor but not pungent | |
| | 80° C. × 2 h | Odorous but not pungent | Pungent odor | |
| Wear resistance under dry condition(%) | | 88 | 73 | 100 |
| Wear resistance under wet condition(%) | Slip angle 14° | 85 | 82 | 61 |
| | Slip angle 25° | 80 | 76 | 42 |

In Example 1, due to the rubber is combined with the glass fiber and the addition of carbon black is omitted, there is no interfacial separation of rubber polymer and carbon black generated due to uneven mixing of carbon black or carbon black itself, and the result is that although the hardness of Example 1 and Comparative Example 1 is lower than that of Comparative Example 2, the tensile strength is increased, and the wear resistance under dry conditions is still within the allowable range. Meanwhile, comparing the wear resistance under dry conditions of Example 1 and Comparative Example 1, the wear resistance of Example 1 is found to be higher than that of Comparative Example 1; whereas, under wet conditions, the difference between the wear resistances of Example 1 and Comparative Example 1 is quite small. The main reason for this result is that Comparative Example 1 utilizes the known accelerant, whose frictional effect under dry condition test at 50° C. and wear resistance test may partially result decomposition and produce irritating substances, which reduces the quality of the tire. Otherwise, the wear resistance of Comparative Example 2 under dry conditions is also inferior to that of Example 1.

In Comparative Example 2, the wear resistance under the wet condition is reduced, possibly because the filler silica added in Comparative Example 2 adsorbed water at the interface mixed with the rubber, thereby weakening the interaction between the rubber polymer and filler silica. In both of Example 1 and Comparative Example 1, filler carbon black and silane are omitted, and glass fiber are added, and the wear resistances under wet conditions are not significantly reduced.

As a result of the odor test on the finished tire product, the tire of Example 1 has unobvious and not pungent odor at room temperature; after being heated at 80° C. for 2 hours, there was odor but not pungent. However, the tires of Comparative Example 1 and Comparative Example 2 have obvious but not pungent odor at room temperature and have pungent odor after heating at 80° C. for 2 hours. Due to the amount of the accelerant added into the tire is relative small, the odor test result is better than that in Table 3. However, it will still do harm to health under long period in the tire environment of Comparative Examples 1 and 2.

Example 2

Weighing 20 phr of natural rubber, 23 phr of butadiene rubber, 36 phr of styrene-butadiene rubber, 21 phr of ethylene-propylene rubber, 30 phr of glass fiber, 10 phr of sulfur, and 5 phr of TBSI; thoroughly mixing the components other than sulfur and TBSI in a tangential mixer; then adding sulfur and TBSI and mixing well; melting extrusion the mixture; further mixing the extrusion mixture and producing a tire sample by a conventional method in the rubber industry.

Comparative Example 3

The difference from Comparative Example 3 and Example 2 is that the comparative example 1 utilizes 3 phr of accelerant TBBS and 2 phr of anti-scorching agent CTP instead of 5 phr of TBSI in Example 2.

The tire samples obtained in Example 2 and Comparative Example 3 are also subjected to the above tests, and the test results are shown in Table 7.

TABLE 7

Sample test results of Example 2 and Comparative Example 3

| Test items | | Example 2(TBSI) | Comparative Example 3(TBBS + CTP) |
|---|---|---|---|
| Shore A hardness at room temperature | | 66.7 | 63.1 |
| Elasticity at room temperature(%) | | 25.9 | 24.1 |
| Elasticity at 70° C. (%) | | 23.3 | 19.0 |
| Tensile strength at room temperature(MPa) | | 16.2 | 14.9 |
| Odor test | Room temperature | Unobvious odor | Obvious odor but not pungent |
| | 80° C. × 2 h | Odorous but not pungent | Pungent odor |
| Wear resistance under dry condition(%) | | 90 | 62 |
| Wear resistance under wet condition(%) | Slip angle 14° | 85 | 76 |
| | Slip angle 25° | 82 | 69 |

From Table 7, it can be seen that the hardness and elasticity of the two types of tire samples are not significantly different at room temperature, but the elasticity of the sample of Comparative Example 3 significantly decreases at 70° C. Meanwhile, as a result of the odor test, the odor of Comparative Example 3 is heavier. The reason for the above results is that both of the accelerant TBBS and the anti-scorching agent CTP applied in Comparative Example 3 may decompose under heating. Therefore, it can be seen that replacing the TBBS and the CTP of Comparative Example 3 with the TBSI of Example 2 not only makes TBSI to serve both as accelerant and anti-scorching agent, but also avoids the odor problems caused by decomposition of TBBS and CTP at high temperatures.

Example 3

Weighing 20 phr of natural rubber, 23 phr of butadiene rubber, 36 phr of styrene-butadiene rubber, 21 phr of ethylene-propylene rubber, 80 phr of glass fiber, 10 phr of sulfur, 4.5 phr of TBSI, and 2 phr of CBBS; thoroughly mixing the components other than sulfur, TBSI and CBBS in a tangential mixer; then adding sulfur, TBSI and CBBS and mixing well; melting extrusion the mixture; further mixing the extrusion mixture and producing a tire sample by a conventional method in the rubber industry.

Comparative Example 4

The difference from Comparative Example 4 and Example 3 is that Comparative Example 4 utilizes 2.5 phr of CBS and 2.5 phr of the accelerant CTP instead of 3 phr of TBSI and 2 phr of CBBS in Example 3.

The tire samples obtained in Example 3 and Comparative Example 4 are also subjected to the above tests, and the test results are shown in Table 8.

TABLE 8

Sample test results of Example 3 and Comparative Example 4

| Test items | | Example 3(TBSI + CBBS) | Comparative Example 4(CBS + CTP) |
|---|---|---|---|
| Shore A hardness at room temperature | | 69.7 | 62.5 |
| Elasticity at room temperature(%) | | 25.9 | 22.8 |
| Elasticity at 70° C. (%) | | 23.3 | 17.2 |
| Tensile strength at room temperature(MPa) | | 16.2 | 12.3 |
| Odor test | Room temperature | Unobvious odor | Obvious pungent odor |
| | 80° C. × 2 h | Odorous but not pungent | Quite pungent odor |
| Wear resistance under dry condition(%) | | 83 | 53 |
| Wear resistance under wet condition(%) | Slip angle 14° | 81 | 67 |
| | Slip angle 25° | 75 | 61 |

From table 8, it can be seen that the elasticity of the tire sample of Comparative Example 4 significantly decreases at 70° C. as comparing with that of the sample at room temperature. Meanwhile, as a result of the odor test, the odor of Comparative Example 4 is heavier. The reason for the above results is that the accelerant CBS and the anti-scorching agent CTP applied in Comparative Example 4 may decompose under heating. Therefore, it can be seen that the TBSI and the CBBS of Example 3 could not decompose at high temperatures and cause odor problems.

Example 4

Weighing 96.25 phr of solution-polymerized styrene-butadiene rubber, 30 phr of butadiene rubber, 70 phr of glass fiber, 1.7 phr of sulfur, 2 phr of CBBS, and 1 phr of ZDTP; thoroughly mixing the components other than sulfur, CBBS, and ZDTP in a tangential mixer; then adding sulfur, CBBS and ZDTP and mixing well; melting extrusion the mixture; further mixing the extrusion mixture and producing a tire sample by a conventional method in the rubber industry.

Comparative Example 5

The difference from Comparative Example 5 and Example 4 is that Comparative Example 5 uses 2 phr of CBBS and 2 phr of accelerant DPG instead of 2 phr of CBBS and 1 phr of ZDTP in Example 4.

The tire samples obtained in Example 4 and Comparative Example 5 are also subjected to the above tests. The test results are shown in Table 9.

TABLE 9

Sample test results of Example 4 and Comparative Example 5

| Test items | | Example 4(CBBS + ZDTP) | Comparative Example 5(CBS + DPG) |
|---|---|---|---|
| Shore A hardness at room temperature | | 65.7 | 59.5 |
| Elasticity at room temperature(%) | | 24.8 | 21.0 |
| Elasticity at 70° C. (%) | | 21.4 | 15.1 |
| Tensile strength at room temperature(MPa) | | 15.8 | 11.2 |
| Odor test | Room temperature | Unobvious odor | Obvious pungent odor |
| | 80° C. × 2 h | Odorous but not pungent | Quite pungent odor |
| Wear resistance under dry condition(%) | | 79 | 57 |
| Wear resistance under wet condition(%) | Slip angle 14° | 82 | 63 |
| | Slip angle 25° | 71 | 53 |

From table 9, it can be seen that the elasticity of the tire sample of Comparative Example 5 significantly decreases at 70° C. as comparing with that of the sample at room temperature. Meanwhile, the odor of Comparative Example 5 is heavier. The reason for the above result is that both of the accelerant CBS and DPG used in Comparative Example 5 may decompose under heating. Therefore, it can be seen that the CBBS and the ZDTP of Example 4 could not decompose at high temperatures and cause odor problems.

In addition, to further compare the performance of the TBSI-containing compound in Example 2 with the TBBS and CTP containing compound in Comparative Example 3, the performance of the TBSI and CBBS containing compound in Example 3 and the CBS and CTP containing compound in Comparative Example 4, and the performance of the CBBS and ZDTP containing compound in Example 4 and the CBS and DPG containing compound in Comparative Example 5, the present application also tests the vulcanization degree (MH-ML), the scorch time, and the fracture elongation of the compound. The vulcanization degree is determined by the vulcanization curve measured by vulcanizer in accordance with ASTM D2084 standard. The scorch time is determined by Mooney viscometer, and is represented in this application by t5 and t35 on the vulcanization curve. The scorching time could reflect the weather and fire resistance of the products. The fracture elongation is measured by universal electronic tensile machine (Shimadzu AG-10KNA, Japan) and vernier caliper. The results are shown in Table 10.

TABLE 10

Performance test results of the samples of Examples 2 to 4 and Comparative Examples 3 to 5

| | | Vulcanization degree(dNm) | Scorch time t5 (min) | Scorch time t35 (min) | Fracture elongation (%) |
|---|---|---|---|---|---|
| Example 2 | TBSI | 16.83 | 26.81 | 39.8 | 373 |
| Comparative Example 3 | TBBS + CTP | 14.8 | 32.97 | 37.45 | 362 |
| Example 3 | TBSI + CBBS | 16.20 | 24.08 | 35.62 | 425 |
| Comparative Example 4 | CBS + CTP | 13.01 | 19.16 | 25.21 | 391 |
| Example 4 | CBBS + ZDTP | 17.11 | — | — | 435 |
| Comparative Example 5 | CBS + DPG | 16.28 | — | — | 376 |

From the above comparison, it can be seen that the rubber mixtures of Example 2, Example 3, and Example 4 could obtain better cross-linking efficiency, high temperature resistance, and mechanical performance than that of Comparative Example 3, Comparative Example 4, and Comparative Example 5, respectively. Therefore, it can be seen that the accelerant in the present application could not only replace the accelerant in the prior art, but also superior to the accelerant in the prior art in certain performances.

Example 5

The difference from Example 5 and Example 3 is that Example 5 further includes 2 phr of anti-scorching agent CTT, which has a scorch time t5 of 28.08 minutes and a scorch time t35 of 40.2 minutes. After the addition of the anti-scorching agent, the early vulcanization is disappeared, the vulcanization speed is decreased, and the scorch performance is improved.

Example 6

The difference from Example 6 and Example 3 is that Example 6 further includes 2.5 phr of plant essence. In comparison with the odor test of Example 3, the sample of Example 6 does not have bad odor and only emits fragrant odor.

In summary, the environmental friendly rubber mixture of the present disclosure and the tires (especially spare tires) made by the rubber mixture utilize improved accelerants to avoid generation of the pungent volatile organic compound such as aniline, cyclohexylamine, tert-butylamine and the like, therefore improving the odor problems of the tires. In addition, when the use of anti-scorching agent is required, the present disclosure instead the CTP in the prior art by CTT or VE.C to reduce the generation of pungent imine, which also has a positive effect on improving the tire odor. Meanwhile, the present disclosure does not include carbon black, zinc oxide and other substances with fine powders, which reduces dust hazards to the operation workers. Finally, the addition of aromatic substances further enhances the fragrance of the tires on the premise of having as little volatile organic volatiles as possible.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A rubber mixture being consisted essentially of:
a mixture of polar or non-polar rubber, at least one filler, at least one vulcanizing agent, at least one accelerant, and an anti-scorching agent, wherein the accelerant is zinc dialkyldithiophosphate, the amount of the accelerant is 1 phr to 6 phr;

the mixture of polar or non-polar rubber is a mixture of natural rubber or synthetic polyisoprene, butadiene rubber and styrene-butadiene rubber, the amount of the natural rubber or synthetic polyisoprene is 0.1 phr to 20 phr, the amount of butadiene rubber is 2 phr to 50 phr, the amount of styrene-butadiene rubber is 2 phr to 80 phr;

the filler is selected from one or more of the group consisting of: glass fiber, modified kaolin, attapulgite, magnesium carbonate, copper fiber and glass beads, and the amount of the filler is 20 phr to 80 phr;

the at least one vulcanizing agent is selected from the group consisting of sulfur, selenium, tellurium, sulfur-containing compounds, peroxides, quinone compounds, amine compounds, resin compounds, metal oxides, isocyanates, platinum vulcanizing agent, or N, N'-m-phenylene bismaleimide, and the amount of the vulcanizing agent is 1 phr to 10 phr;

the anti-scorching agent is N-chloroformylthio-4-propionene-dicarboximide, and an amount of the anti-scorching agent is 0.1 phr to 5 phr.

2. The rubber mixture according to claim 1, wherein the rubber mixture further comprises an aromatic material, the aromatic substance is a high-temperature-resistant aromatic substance which is plant essence or mint, and an amount of the high-temperature-resistant aromatic substance is 0.1 phr to 3 phr.

3. The rubber mixture according to claim 1, wherein the mixture of polar or non-polar rubber is a mixture of 20 phr of natural rubber, 44 phr of butadiene rubber and 36 phr of solution-polymerized styrene-butadiene rubber.

4. The rubber mixture according to claim 1, wherein the mixture of polar or non-polar rubber is a mixture of 20 phr of natural rubber, 23 phr of butadiene rubber, 36 phr of styrene-butadiene rubber, and 21 phr of ethylene-propylene rubber.

5. A tire, comprising the rubber mixture according to claim 1.

6. The tire according to claim 5, wherein the tire is a spare tire.

* * * * *